United States Patent
George

(10) Patent No.: US 6,397,304 B1
(45) Date of Patent: *May 28, 2002

(54) METHOD AND APPARATUS FOR IMPROVING SYSTEM PERFORMANCE IN MULTIPROCESSOR SYSTEMS

(75) Inventor: Varghese George, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,061

(22) Filed: Jun. 16, 1999

(51) Int. Cl.[7] ................ G06F 12/00; G06F 13/00
(52) U.S. Cl. ............... 711/144; 711/118; 711/145; 711/146
(58) Field of Search ................ 711/119, 121, 711/141, 142, 143, 144, 145, 146, 100, 118

(56) References Cited

U.S. PATENT DOCUMENTS

| | | | | |
|---|---|---|---|---|
| 5,297,269 A | * | 3/1994 | Donaldson et al. | 711/145 |
| 5,737,758 A | * | 4/1998 | Merchant | 711/146 |
| 5,737,759 A | * | 4/1998 | Merchant | 711/146 |
| 5,765,208 A | * | 6/1998 | Nelson et al. | 711/204 |
| 5,778,438 A | * | 7/1998 | Merchant | 711/146 |
| 5,796,977 A | * | 8/1998 | Sarangdhar et al. | 709/1 |
| 5,802,574 A | * | 9/1998 | Atallah et al. | 711/144 |
| 5,875,467 A | * | 2/1999 | Merchant | 711/140 |
| 5,890,200 A | * | 3/1999 | Merchant | 711/108 |
| 5,893,151 A | * | 4/1999 | Merchant | 711/140 |
| 6,073,211 A | * | 6/2000 | Cheng et al. | 711/122 |
| 6,115,795 A | * | 9/2000 | Glida et al. | 711/141 |

\* cited by examiner

*Primary Examiner*—Tuan V. Thai
(74) *Attorney, Agent, or Firm*—Kenyon & Kenyon

(57) ABSTRACT

A method and apparatus to retrieve data for a multiprocessor system is described. A request for data is received at a first processor from a bus. A cache is searched for the data, with the data having a state. A determination is made as to whether the state is an exclusive state or shared state. The data is sent to the bus in accordance with the determination.

11 Claims, 3 Drawing Sheets

METHOD AND APPARATUS FOR IMPROVING SYSTEM PERFORMANCE IN MULTIPROCESSOR SYSTEMS

FIELD OF THE INVENTION

The invention relates to computers in general. In particular, the invention relates to a method and apparatus for improving system performance in multiprocessor systems by expanding the type of data available for implicit writebacks.

BACKGROUND OF THE INVENTION

In a shared memory multiprocessor system, data necessary for one processor is often present in a cache of another processor. It is more efficient to retrieve such data from the cache rather than memory. Furthermore, the system must ensure that a request for data (e.g., by a processor or input/output device) is answered with the most current version of the data available. Therefore, the system processes a request for data by first attempting to retrieve the requested data from a processor's internal cache before going to main memory.

In conventional multiprocessor systems, a request for data is originated by a first processor. The other processors detect the data request and ascertain whether they have the requested data in one of their internal caches ("snoop phase"). If the requested data is present, the processor provides the requested data on a bus for transport to the first processor ("data phase"). This entire process is typically governed by a particular bus protocol for the system, and is generally referred to as an "implicit write back" scheme.

In addition to determining whether the requested data is present in a processor's internal cache, the cache system of the processor must determine the state of the requested data. For example, in a system using the Modified/Exclusive/Shared/Invalid (MESI) cache protocol, the requested data can be in one of four states: Modified (M); Exclusive (E); Shared (S); and Invalid (I). The M state indicates that the data within a cache has been modified relative to the same data stored in main memory. Further, both the M and E states indicate that only one processor in the multiprocessor system owns the requested data. The S state indicates that multiple processors own the data. Finally, the I state indicates that the line is invalid (i.e., the cache does not have a copy of the data).

Conventional implicit write back schemes, however, may be less than satisfactory for a number of reasons. For example, if the requested data that one processor wants to read is present in the M state in another processor's cache, that processor is required to provide the requested data on the bus. If any of the processor's have the data in the S or E state, however, the data is not provided from the processor's cache, but rather it is read from memory. This introduces latency into the data retrieval process, since it is slower to retrieve data from memory than from a cache. Moreover, retrieval from memory may unnecessarily occupy limited main memory bandwidth since other caches contain the requested data.

In view of the foregoing, it can be appreciated that a substantial need exists for a method and apparatus that solves the above-discussed problems.

SUMMARY OF THE INVENTION

One embodiment of the invention comprises a method and apparatus to retrieve data for a multiprocessor system. A request for data is received at a first processor from a bus. A cache is searched for the data, with the data having a state. A determination is made as to whether the state is an exclusive state or shared state. The data is sent to the bus in accordance with the determination.

DETAILED DESCRIPTION

Figure 1:
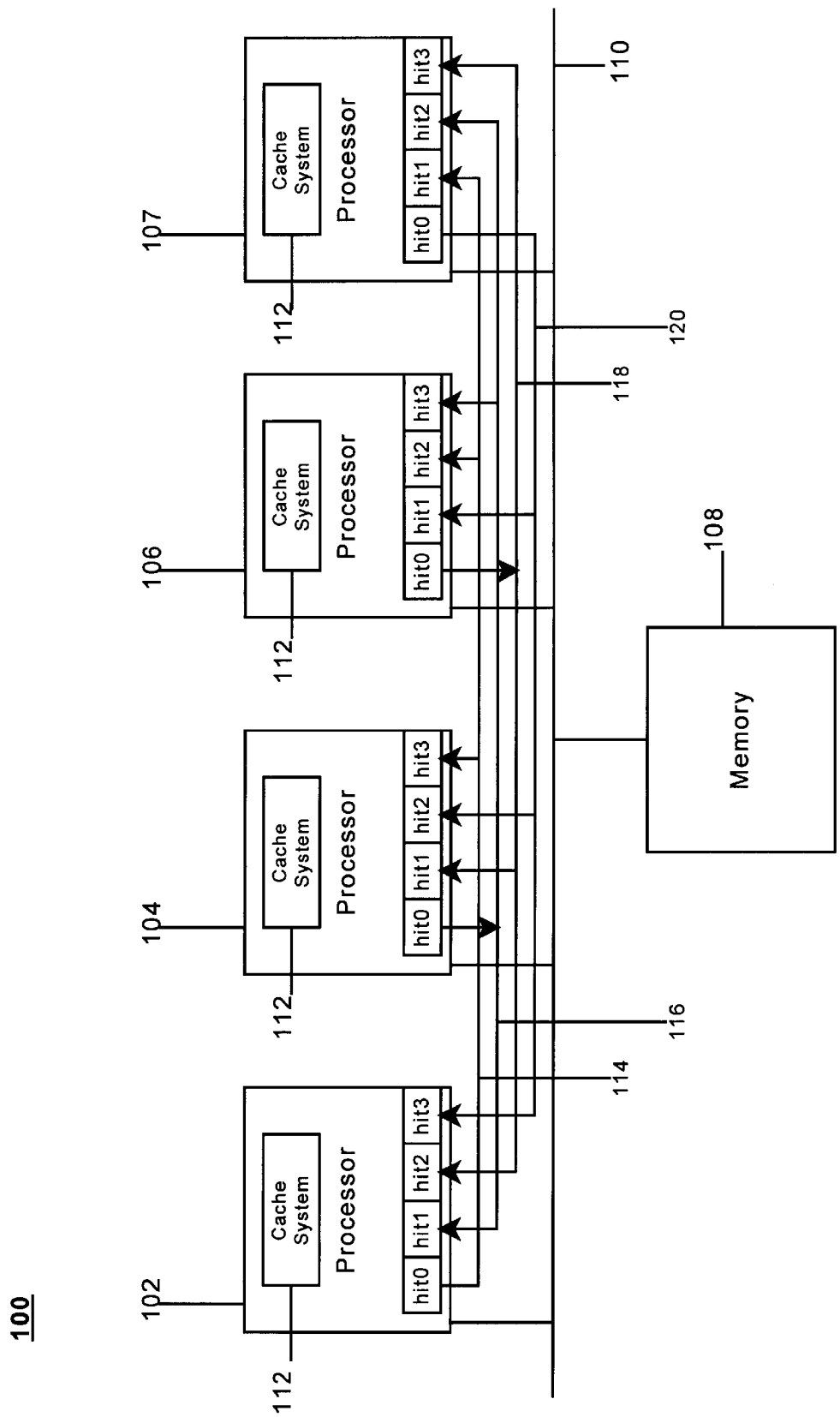
FIG. 1 is a block diagram of a multiprocessor system suitable for practicing one embodiment of the invention.

The embodiments of the invention provide an improved implicit write back scheme for use in multiprocessor system. The improved implicit write back scheme retrieves more types of data from a cache than conventional implicit write back techniques. This results in a faster, and more efficient, computer system.

More particularly, the embodiments of the invention permit the retrieval of data from a processor's cache that is stored in multiple states. For example, one embodiment of the invention utilizes the MESI cache protocol. In this embodiment of the invention, data can be retrieved from a processor's cache that is stored in the M state, E state or S state. This is a substantial improvement over conventional implicit writeback schemes.

Previously, conventional implicit writeback schemes were limited to retrieving cache data stored only in the M state. One reason for this is that a processor must receive the latest copy of the requested data. Thus, a primary consideration driving implicit writeback schemes was not improved performance, but rather maintaining data accuracy. Due to their focus on data accuracy, conventional implicit writeback systems failed to retrieve E or S state data since there was no issue of data accuracy associated with data stored in the E or S state.

Retrieving data stored in a cache in the E state or S state is substantially faster than retrieving the same data from memory. For example, measurements from real workloads such as defined by the Transaction Processing Counsel Benchmark "C" (TPC-C) show that in a four processor system, the chances of a processor finding the data it needs in another processor's cache in the E state or S state is approximately 25–38%, depending on the size of the cache. Moreover, it can take approximately 30–40 bus clocks (assuming a 133 Megahertz bus frequency) for a conventional system to retrieve E state or S state data from memory. By way of contrast, this embodiment of the invention can retrieve E state or S state data from a cache in as little as 6 bus clocks. The actual latencies achievable depend in part on whether the bus protocol allows out-of-order data transfers or not.

The latency decrease derived from this improvement can be further estimated using a simulator. By simulating a TPC-C workload using an in-order bus protocol (such as the Intel® Pentium® Pro bus protocol), it has been determined that this embodiment of the invention will reduce the memory latency for all processor reads anywhere from 16–25% depending on the cache size. This reduction is even greater for code fetches in particular, which is on the order of 27–38%. For a bus protocol that supports out-of-order data transfers the reductions are in the range of 40–42% and 63–67%, respectively.

In addition to the latency decrease, every time a processor provides data from its cache means that the associated chipset does not need to provide the data. This reduces the burden on the chipset and allows it to do more useful work. The diversion of work from the chipset to the processors takes advantage of the high bandwidth and short latencies associated with current L2 caches, while reducing the demand for system memory; and system memory latencies which are relatively scarce resources.

The capability of retrieving data stored in a cache in the E state or S state is also advantageous from a bus utilization viewpoint. Since more data reads come from the processors in a multiprocessor system, each processor can provide data very efficiently on the connecting bus.

It is worthy to note that any reference in the specification to "one embodiment" or "an embodiment" means that a particular feature, structure, or characteristic described in connection with-the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a multiprocessor system suitable for practicing one embodiment of the invention. As shown in FIG. 1, a multiprocessor system 100 comprises processors 102, 104, 106 and 107. Each processor includes a cache system 112. System 100 also includes a memory 108, which is connected to processors 102, 104 and 106 via a bus 110.

Processors 102, 104, 106 and 107 are also connected to each other via lines 114, 116, 118 and 120. Each line is present to carry a signal defined as HIT0#, HIT1#, HIT2# or HIT3#. HIT0# is an output signal from a processor indicating that the processor has the requested data in its internal cache in one of an E or S state and its willingness to provide data for the data request. HIT[1–3]# are inputs to a processor which come from other processor's HIT0# output indicating other processors have the requested data in their internal caches in one of an E or S state and their willingness to provide data for the data request. The use of these signals will be discussed with reference to FIG. 3.

It can be appreciated that the particular configuration shown herein is chosen as an example only and is not limitive of the type of computer system on which the present invention can work. The number of configurations that computer systems can take are virtually limitless and techniques for setting up these configurations are well known to those skilled in the art. The present invention can operate on any of these possible configurations.

Figure 2:
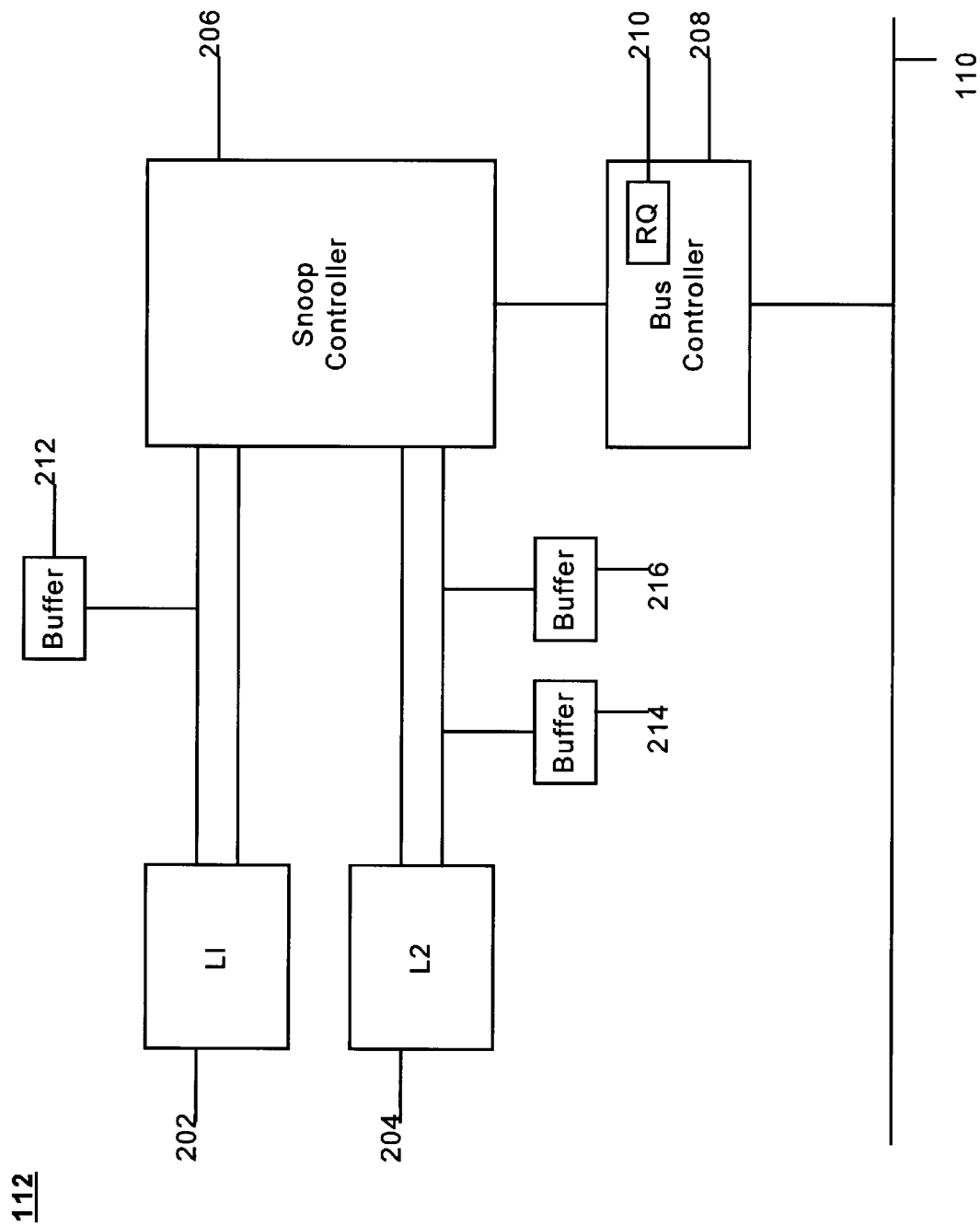
FIG. 2 is a block diagram of a cache system in accordance with one embodiment of the invention.

FIG. 2 is a block diagram of a cache system in accordance with one embodiment of the invention. FIG. 2 shows cache system 112 comprising a snoop controller 206 connected to bus 110 via a bus controller 208. Bus controller 208 includes a request queue 210. Snoop controller 206 is also connected to an L1 cache 202, an L2 cache 204, and buffers 212, 214 and 216.

Cache system 112 performs implicit writebacks in accordance with a bus protocol. In this embodiment of the invention, cache system 112 performs implicit writebacks in accordance with the Intel® Pentium® Pro bus protocol bus protocol.

Snoop controller 206 controls the overall operation for the implicit write back scheme for a particular processor. In particular, snoop controller 206 implements in circuit form an implicit write back algorithm, which is modified to implement the functionality discussed in detail with reference to FIG. 3. The operation of cache system 112 in general, and snoop controller 206 in particular, will also be discussed with reference to FIG. 3.

Figure 3:
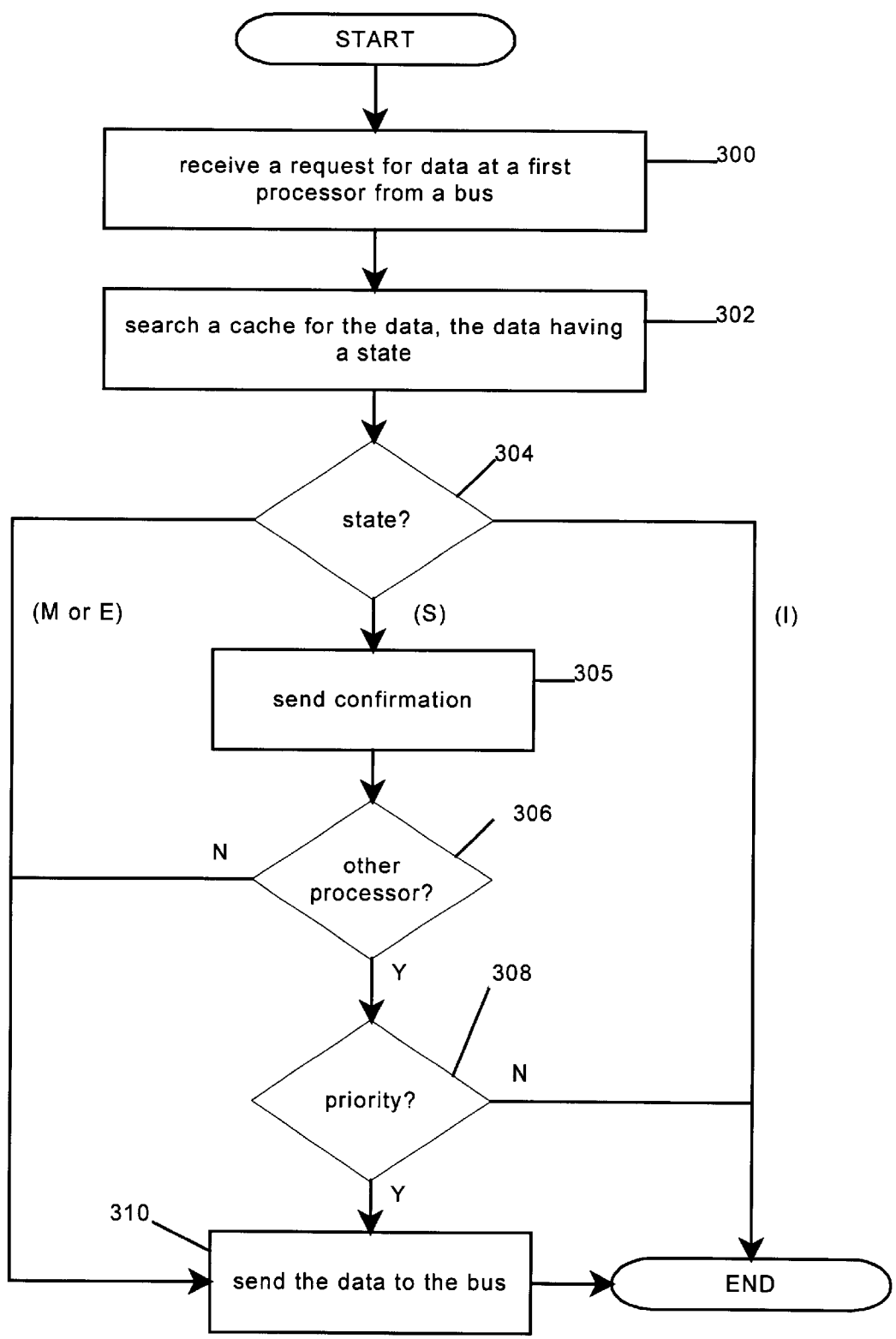
FIG. 3 is a block flow diagram of the operation of a snoop controller in accordance with one embodiment of the invention.

FIG. 3 is a block flow diagram of the operation of a snoop controller in accordance with one embodiment of the invention. As shown in FIG. 3, a data request is received at a first processor from a bus at step 300. A search is made as to whether the requested data is present in one of its internal caches of the processor at step 302.

A determination is made as to the state of the requested data at step 304. As previously explained, cache data exists in one of many states, depending on such factors as which processor "owns" the data and whether it has been modified. In this embodiment of the invention, each possible state for the data is defined by the MESI cache protocol. If the requested data is in an M or E state at step 304, then this data is sent to the bus at step 310. If the requested data is in the I state at step 304, then the process ends.

If the requested data is in the S state at step 304, then the cache system for the first processor sends a confirmation signal to let the other processors know that it has the requested data in the S state at Step 305. The cache system then determines which of the other processors also has the requested data in one of its internal caches at step 306. In this embodiment of the invention, steps 304 and 306 are accomplished using the signals defined as HIT0#, HIT1#, HIT2# or HIT3#, which will be described in more detail later. Once one or more of the above signals are received at the first processor from the bus indicating that a second processor (and/or third processor and/or fourth processor) also has the requested data, a determination is made as to whether the first processor or the second processor (or another processor having the requested data) should send the requested data using a priority scheme at step 308. The requested data is then sent to the bus in accordance with the priority scheme at step 310, at which time this process completes.

In this embodiment of the invention, steps 304 and 306 are implemented as follows. Each processor is connected via lines 114, 116, 118 and 120. If a processor has the requested data in the S state, it drives an output HIT#0 signal which is detected by the other processors. For example, if processor 102 has the requested data, it will send an output HIT0# signal via line 114. Processors 104, 106 and 107 will detect the HIT0# signal -sent via line 114 as input signals HIT3#, HIT2# and HIT1# for processors 104, 106 and 107, respectively. Similarly, if processor 104 has the requested data, it will send an output HIT0# signal via line 116. Processors 102, 106 and 107 will detect the signal sent via line 116 as input signals HIT1#, HIT3# and HIT2# for processors 102, 106 and 107, respectively. This continues for processors 106 and 107. It can be appreciated that as the number of processors increase or decrease within a given system, that the above-described configuration could be modified accordingly and still fall within the scope of the invention.

In view of the above, if the first processor has the requested data in S state at step 304, it will send a confirmation signal (e.g., HIT0#) indicating such to the other processors. The first processor will then determine which of the other processors also has the requested data in the S state by checking the HIT[1–3]# input signals. This information will be used, in conjunction with a priority scheme, to determine which processor should actually drive the requested data on the data bus.

The embodiments of the invention help relieve processing burdens from the system chipset. The system chipset, when detecting any of the HIT[0–3]# signals as active, will know that it does not need to provide the data for this particular data request and it will let one of the processors provide the requested data on the bus.

In this embodiment of the invention, a mechanism is helpful in resolving the situation where more than one processor has the requested data (i.e., in the S state). This is a fairly common scenario in the MESI cache protocol. In such a case, one processor should be picked as the provider of data and also to inform every other processor in the system as to which processor is picked, so that only processor will actually drive the data bus during the data phase.

In this embodiment of the invention, a priority scheme is implemented for handling this situation. The priority scheme utilizes an agent identifier (AgentID) which is a unique identifier for each processor. The AgentID can be assigned during the system initialization process. For example, in this embodiment of the invention processors 102, 104, 106 and 107 are assigned AgentID numbers 0, 1, 2 and 3, respectively. Thus, at step 308, each processor will execute an algorithm as follows:

```
BEGIN 'Determine if I need to drive the data bus on a HIT'
{
    I_should_drive_the_bus=FALSE;
    Let each CPU sample its HIT0#, HIT1#, HIT2# and
        HIT3# pins during the snoop phase. Let the sampled
        binary values be w, x y and z respectively. Let a value
        of '1' indicate active and 'O' indicate 'inactive'.
    If(w is FALSE){#If you are not a candidate, quit now!
        Exit (0);
    }
    If(ID==O){#If I am AgentID O, I am picked
        I_should_drive_the_bus=TRUE;
        Exit (O);
    }
    if(ID==1){#If I am AgentID 1 and Agent ID 0 wasn't
        picked, I am picked.
        if(z==0){
            I_should_drive_the_bus=TRUE;
        }
        Exit (0);
    }
    if(ID==2){#If I am AgentID 2 and neither ID 0 or 1 was
        picked, I am picked.
        if(z==0 & & y==0){
            I_should_drive_the_bus=TRUE;
        }
        Exit (0);
    }
    if(ID==3){#If I am AgentID 3 and neither ID 0, 1 or 2 was
        picked, I am picked.
        if(z==0 & & y==0 & & x ==0){
            I_should_drive_the_bus=TRUE;
        }
        Exit (0);
    }
}
END 'Determine if I need to drive the bus on a HIT'
```

Thus, using the above priority scheme, the cache system for the first processor would use the information gathered at step 306 to determine whether it should drive the requested data on the data bus at step 310. If another processor is selected by the priority scheme at step 308, the cache system for the first processor would simply end the process. If the first processor has priority according to the priority scheme at step 308, then the first processor sends the requested data to the bus at step 310 and terminates the process.

The implicit write back scheme of FIG. 3 may be better understood using an example. For clarity, system 100 and cache system 112 will be used in the example. It can be appreciated, however, that the principles set forth herein could be used with any multiprocessor system or cache system and still fall within the scope of the invention.

In this example, processor 102 receives a data request from processor 104 over bus 110. Cache system 112 of processors 102, 106 and 107 receive the data request and begin the snoop phase at step 300. Each cache system 112 determines whether the requested data is present in one of its internal caches L1 202 or L2 204, and the current state of the requested data at step 302. If caches L1 202 or L2 204 has the requested data in an I state at step 304, then the process is completed. If either L1 202 or L2 204 has the requested data in an M state or an E state at step 304, then snoop controller 112 sends the data to the bus at step 310 and the process terminates.

If the requested data is in the S state at step 304, then snoop controller 206 for processor 102 sends a confirmation signal to let processors 104, 106 and 107 that processor 102 has the requested data in the S state. Snoop controller 206 then determines which of the other processors also has the requested data in one of its internal caches at step 306. In this example, snoop controller 206 performs this function by checking the pins for input signals HIT[1–3]# during the snoop phase to determine which are active. Assume for purposes of this example that input signal HIT3# is active for processor 102. Snoop controller 206 is now aware that processor 107 also contains the requested data in the S state. Snoop controllers 206 for both processors 102 and 107 check the priority scheme to determine whether processor 102 or processor 107 should send the requested data at step 308. Assume for this example that processor 102 is AgentID 0 and processor 107 is AgentID 3, and further assume that the sample binary values for input signals HIT0#, HIT1#, HIT2# and HIT3# are w, x, y and z, respectively. Snoop controller 206 for processor 102 determines that since w is active (e.g., has a value of "1"), and since AgentID 0 is first in the priority scheme, then processor 102 is selected to drive the requested data. Similarly, snoop controller 206 for processor 107 determines that since w and x are active (e.g., has a value of "1"), and since AgentID 0 comes before AgentID 3 in the priority scheme, then processor 102 has been selected and processor 107 is not to drive the requested data on the data bus. Snoop controller 206 for processor 102 then sends the requested data to the bus at step 310, accordingly, and snoop controller 206 terminates the process.

Although various embodiments are specifically illustrated and described herein, it will be appreciated that modifications and variations of the present invention are covered by the above teachings and within the purview of the appended claims without departing from the spirit and intended scope of the invention. For example, although only four processors (processors 102, 104, 106 and 107) were used in system 100, it can be appreciated that any number of processors could be used and still fall within the scope of the invention. Further, although the MESI cache protocol was used in the embodiments of the invention, any cache protocol having data in a shared state or exclusive state could be used in accordance with the principles described herein and still fall within the scope of the invention.

What is claimed is:

1. A method to retrieve data for a multiprocessor system, comprising:

assigning a first identifier to a first processor and a second identifier to a second processor indicating respective priorities;

receiving a request for data at said first processor from a bus;

searching a cache of said first processor for said data, said data having a state;

determining whether said state is one of exclusive or shared;

receiving a first signal at said first processor from said bus indicating said second processor has said data;

determining whether said first processor or said second processor should send said data using a priority scheme, wherein said first processor sends said data if said first identifier indicates a higher priority that said second identifier and, otherwise, said second processor sends said data; and sending said data to said bus in accordance with said priority scheme.

2. The method of claim 1, further comprising sending a second signal from said first processor to said second processor indicating said first processor has said data.

3. The method of claim 1, further comprising:

sending a third signal from said first processor to said bus indicating said first processor has said data, said third signal being sent using the same timing as the second signal.

4. An apparatus comprising:

a cache memory having a first identifier indicating a priority; and control logic:
  to receive a data request from said bus;
  to determine if said data request is for data in an exclusive or shared state in said cache memory;
  to responsively provide data to said bus if said data request is for data in an exclusive state in said cache memory;
  if said data request is for data in a shared state in said cache memory, to determine whether data in said shared state should be sent to the data bus in response to said data request, wherein said data is sent to said data bus from said cache memory if said first identifier has a higher priority than a second identifier of another cache memory sharing said data with said cache memory; and
  to selectively provide data in a shared state in said cache memory to the data bus based on said determination.

5. The apparatus of claim 4, wherein said control logic comprises a snoop controller and a bus controller.

6. The apparatus of claim 4, wherein said control logic determines whether to send data in said shared state to said bus as a function of cache control signals received from another cache.

7. A system, comprising:

a first processor having a first cache system and a first identifier indicating a priority of said first processor, said first cache system capable of sending a data request;

a second processor having a second cache system and a second identifier indicating a priority of said second processor;

a third processor having a third cache system and a third identifier indicating a priority of said third processor;

a bus to communicate signals between said first, second and third cache systems; and wherein said second and third cache systems each include a cache to store data identified by said data request in an exclusive or shared state, wherein said second and third cache systems are capable of receiving said data request, and determining whether to send said stored data to said first processor in response to said data request using said bus based on said second and third identifiers, wherein said second and third cache systems are connected to each other by at least two signal lines to communicate signals indicating whether each cache for said cache systems contain stored data in said shared state, and wherein said second cache system sends said stored data in said shared state to said first processor if said second identifier has a higher priority than said third identifier and, otherwise, said third cache system sends said stored data in said shared state to said first processor.

8. The system of claim 7, wherein said stored data is in said shared state.

9. The system of claim 8, wherein said second and third cache systems use a priority scheme, based on said second and third identifiers, and said signals to determine whether to send said stored data to said first processor in response to said data request using said bus.

10. A method to retrieve data for a multiprocessor system, comprising:

assigning a first identifier to a first processor indicating a priority;

receiving a request for data at said first processor from a bus;

searching a cache of said first processor for said data, said data having a state;

determining if said data request is for data in an exclusive or shared state in said cache;

responsively providing data to said bus if said data request is for data in an exclusive state in said cache;

if said data request is for data in a shared state in said cache, determining whether data in said shared state should be sent to the data bus in response to said data request based on a priority scheme, wherein said first processor sends said data to said data bus if said first identifier indicates a higher priority than a second identifier of a second processor sharing said data with said first processor; and selectively providing data in a shared state in said cache to the data bus based on said determination.

11. The method according to claim 10 wherein said step of determining comprises:

receiving a first signal at said first processor from said bus indicating said second processor has said data.

* * * * *

UNITED STATES PATENT AND TRADEMARK OFFICE
CERTIFICATE OF CORRECTION

PATENT NO. : 6,397,304 B1
DATED : May 28, 2002
INVENTOR(S) : Varghese George

It is certified that error appears in the above-identified patent and that said Letters Patent is hereby corrected as shown below:

<u>Column 7,</u>
Line 16, change "that said" to -- than said --.

Signed and Sealed this

Twenty-fifth Day of March, 2003

JAMES E. ROGAN
*Director of the United States Patent and Trademark Office*